Aug. 12, 1958   G. H. MULLER   2,847,078
POWER STEERING DEVICE OF THE HYDRAULIC TYPE
Filed Jan. 4, 1956
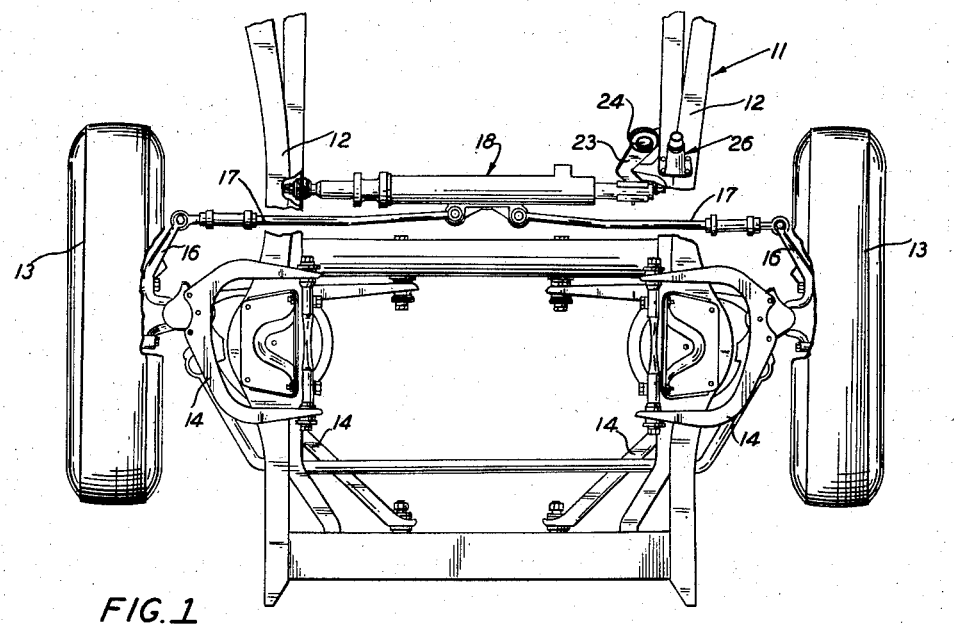
FIG.1
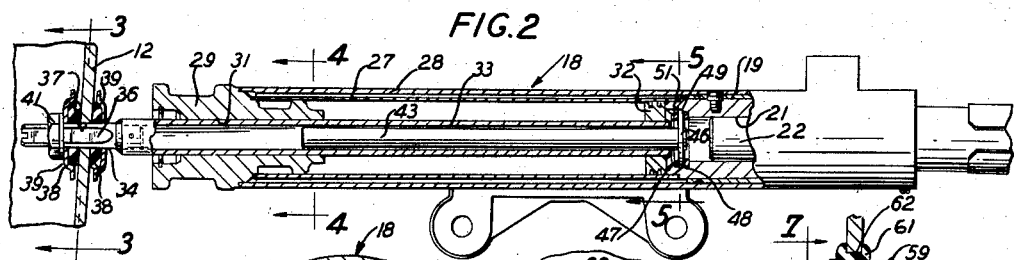
FIG.2
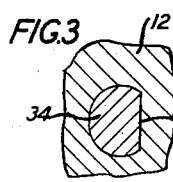
FIG.3
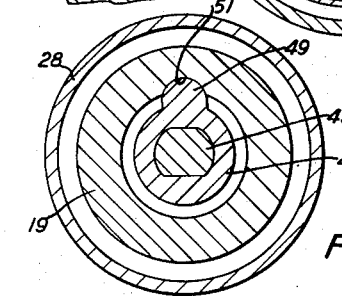
FIG.4
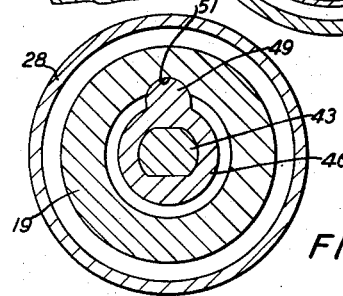
FIG.5
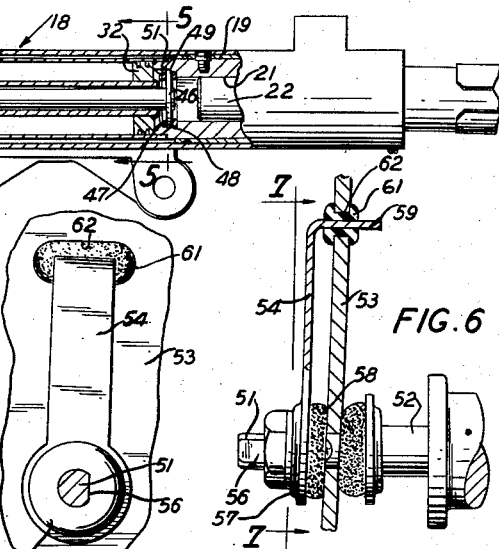
FIG.7   FIG.6
G. H. MULLER
INVENTOR.
BY
ATTORNEYS United States Patent Office 2,847,078
Patented Aug. 12, 1958

2,847,078

POWER STEERING DEVICE OF THE HYDRAULIC TYPE

George H. Muller, Northville, Mich., assignor to Ford Motor Company, Dearborn, Mich., a corporation of Delaware Application January 4, 1956, Serial No. 557,340

6 Claims. (Cl. 180—79.2)

This invention relates generally to a power steering device, and has particular reference to a power steering device for a motor vehicle.

An object of the present invention is to provide a power steering device of the general type in which the power steering cylinder forms part of the steering linkage and is directly connected to the steering tie rods to effect steering of the front road wheels by reciprocation of the cylinder relative to the vehicle frame, and to incorporate in such a power steering device means preventing rotation of the cylinder about its own axis during operation. The power steering cylinder is thus held against rotation resulting from unbalanced forces which may be applied through the tie rods as well as from other sources. The construction of the present invention accomplishes these results economically from the manufacturing standpoint and without creating excessive frictional resistance in the unit during operation.

Other objects and advantages of this invention will be made more apparent as this description proceeds, particularly when considered in connection with the accompanying drawings, wherein:

Figure 1 is a fragmentary plan view of a portion of the motor vehicle chassis incorporating the present invention.

Figure 2 is an enlarged cross sectional view of the power steering device shown in Figure 1.

Figures 3, 4 and 5 are cross sectional views taken on the plane 3—3, 4—4, and 5—5 of Figure 2.

Figure 6 is a fragmentary plan view of a modification.

Figure 7 is an end elevation of the modification shown in Figure 6.

Referring now to the drawing, and particularly to Figure 1, the reference character 11 indicates generally a motor vehicle frame having side frame rails 12. Front steerable road wheels 13 are conventionally supported upon suspension arms 14, in turn pivotally mounted upon the frame 11. Spindle steering arms 16 are connected to the wheels 13 and are joined by steering tie rods 17 to a power steering cylinder assembly 18.

The power steering cylinder assembly 18 comprises a valve housing 19 generally cylindrical in form and having a valve bore 21 formed therein reciprocably receiving a valve spool 22 actuated conventionally by a pitman arm 23 secured to the steering shaft 24 of the steering gear assembly 26. The steering gear assembly 26 is mounted upon the frame side rail 12.

Nonrotatably connected to the valve housing 19 are inner and outer sheet metal cylinders 27 and 28 respectively. At their opposite ends the inner and outer cylinders 27 and 28 are secured to a cylinder end cap 29 having a bore 31 formed therein. The outer cylinder 28 forms a protective cover while the inner cylinder 27 reciprocably receives a piston 32. The outer cylinder is also used as a conduit to convey oil to the end of the cylinder opposite to the valve body. A hollow piston rod 33 extends through the piston 32 and is welded thereto. The hollow piston rod 33 slidably extends through the bore 31 in the cylinder end cap 29, and its outer end receives a short mounting rod 34 suitably welded to the piston rod.

The mounting rod 34 has a flat 36 formed at one side thereof and is received within a correspondingly shaped hole 37 in the frame side rail 12. The necessary angular movement of the piston rod 33 is accommodated by means of annular rubber insulators 38. Washers 39 and a lock nut 41 complete the assembly, and it will be noted that the piston rod 33 is thus connected to the frame rail 12 in such manner as to prevent rotary movement as well as endwise movement relative to the frame while permitting slight angular movement as required by the swinging movement of the pitman arm 23.

Referring now to Figure 4, it will be noted that the internal shape of the hollow piston rod 33 is noncircular, having a flat portion 42. Slidably received within the hollow piston rod 33 is a guide rod 43 which, as seen in Figure 4, has a cross sectional shape corresponding to the internal cross sectional shape of the hollow piston rod 33, with a flat side 44 on the guide rod engaging the flat side 42 in the piston rod. It will be apparent that the piston rod 33 and guide rod 43 are arranged for relative sliding movement but that relative rotation between the two is effectively prevented.

The inner end of the guide rod 43 projects beyond the inner end of the hollow piston rod 33, and has welded thereto a plate 46, best seen in Figures 2 and 5. The plate 46 is received within the adjacent end of the valve bore 21 of the valve housing 19, and is held against axial movement by a pair of retaining rings 47 and 48. Relative rotation between the plate 46 and the valve housing 19 is prevented by the provision of a semicircular tongue 49 on the plate 46 engageable within a corresponding semicircular groove 51 formed in the valve housing 19.

With the construction described above, power steering of the front road wheels is accomplished by introducing fluid under pressure to the appropriate side of the piston 32 under the control of the conventional valve spool 22 actuated by the pitman arm 23. The resulting reciprocation of the power steering cylinder 18 effects steering of the wheels through the tie rods 17 and the steering arms 16. During such steering operations, the power cylinder 18 is subjected to forces tending to rotate it about its own axis. Included among such forces are those applied to the cylinder 18 through the offset connection of the tie rods 17 to the brackets 50 carried by the cylinder. It will be seen, however, that the interconnections between the frame rail 12, piston rod 33, guide rod 43, and the end plate 46 effectively prevent rotation of the cylinder 18 about its axis while at the same time permitting the necessary reciprocation of the cylinder. By restraining the cylinder against rotation, misalignments are eliminated and binding which might otherwise occur between the pitman arm and the valve mechanism is prevented. These results are obtained by a construction which does not materially increase the frictional resistance to reciprocation of the cylinder.

Figures 6 and 7 show a modification in which the mounting rod 51 secured to the outer end of the piston rod 52 projects freely through the side frame rail 53 and is anchored against rotation by an arm 54. The arm 54 is nonrotatably mounted on the rod 51 by engagement with the flat side 56 of the rod. The lower end 57 of the arm is formed as a washer and engages the face of the rubber insulator 58.

The upper end of the anchor arm 54 is formed with a bent flange 59 projecting through a rubber grommet 61 mounted in an aperture 62 in the frame rail 12. The arm thus forms a lever anchoring the piston rod against rotation.

It will be seen that an anti-rotation device is thus provided which is located internally of the cylinder, and is thus protected. In the embodiment shown the anti-rotation connection is made between the piston rod and the cylinder, but can also be made between the piston and the cylinder. For example, a rod mounted in the cylinder end cap and slidably extending through the piston will effectively operate in the same manner.

It will be understood that the invention is not to be limited to the exact construction shown and described but that various changes and modifications may be made without departing from the spirit and scope of the invention, as defined in the appended claims.

What is claimed is:

1. A power steering device for a motor vehicle having a frame, a manually rotatable steering shaft, a pitman arm on said steering shaft, steerable road wheels, and steering linkage connected to the road wheels, comprising a cylinder disposed generally transversely of said vehicle and pivotally connected adjacent one end to said pitman arm, a piston within said cylinder, a piston rod member secured to said piston and projecting beyond the end of said cylinder remote from its pivotal connection to said pitman arm, means nonrotatably connecting the projecting end of said piston rod member to said vehicle frame, means pivotally connecting said steering linkage to an intermediate point on said cylinder to actuate said linkage and said steering wheels by reciprocation of said cylinder relative to said frame, and a rod member nonrotatably connected to said cylinder, one of said members being generally tubular and telescopically and nonrotatably receiving the other of said members to prevent rotation of said cylinder about its axis while permitting reciprocation of said cylinder and the steering linkage connected thereto relative to said vehicle frame.

2. A power steering device for a motor vehicle having a frame, a manually operable steering shaft, a pitman arm on said steering shaft, steerable front road wheels and steering linkage connected to said road wheels, comprising a generally cylindrical valve housing pivotally connected to said pitman arm and having a valve bore therein, a sheet metal cylinder extending from one end of said valve housing, an end cap secured to the opposite end of said cylinder and having a bore formed therein, a piston rod nonrotatably connected to said vehicle frame and slidably projecting through the bore in said end cap, the portion of said piston rod projecting within said cylinder being hollow and having noncircular guide means formed internally thereof, a piston secured to the inner end of the hollow portion of said piston rod and relatively reciprocable with said cylinder, an elongated guide rod received within the hollow portion of said piston rod, one end of said elongated guide rod having a cross sectional shape corresponding in shape to the noncircular internal cross sectional shape of the hollow portion of said piston rod to permit slidable movement between said piston rod and said guide rod while preventing rotation therebetween, said guide rod projecting beyond the inner end of said piston rod and into the adjacent end of the valve bore in said valve housing, a flange at the inner end of said guide rod, said flange having interlocking means with said valve housing to prevent relative rotation between said guide rod and said valve housing to restrain said cylinder against rotation about its axis relative to said piston rod and to said vehicle frame.

3. A power steering device for a motor vehicle having a frame, a manually rotatable steering shaft, a pitman arm on said steering shaft, steerable road wheels, and steering linkage connected to the road wheels, comprising a cylinder disposed generally transversely of said vehicle and pivotally connected adjacent one end to said pitman arm, a piston within said cylinder, a piston rod secured to said piston and projecting beyond the end of the cylinder remote from its pivotal connection to said pitman arm, the inner end of said piston rod being hollow, means nonrotatably connecting the projecting end of said piston rod to said vehicle frame, means pivotally connecting said steering linkage to an intermediate point on said cylinder to actuate said linkage and said steering wheels by reciprocation of said cylinder relative to said frame, and an element extending through a hollow portion of said piston rod and slidably and nonrotatably connected to said piston rod, said element being nonrotatably connected to said cylinder beyond the full stroke of said piston rod and piston to prevent rotation of said cylinder about its axis while permitting reciprocation of said cylinder and the steering linkage connected thereto relative to said vehicle frame.

4. The structure defined by claim 3 which is further characterized in that the internal cross sectional shape of the hollow portion of said piston rod is noncircular, and the end of said element remote from its connection to said cylinder corresponds in shape to the noncircular internal shape of said hollow piston rod to permit relative sliding movement therebetween but to prevent relative rotation therebetween.

5. A power steering device for a motor vehicle having a frame, a manually rotatable steering shaft, a pitman arm on said steering shaft, steerable road wheels, and steering linkage connected to the road wheels, comprising a cylinder disposed generally transversely of said vehicle and pivotally connected adjacent one end to said pitman arm, a piston within said cylinder, a piston rod secured to said piston and projecting beyond the end of said cylinder remote from its pivotal connection to said pitman arm, means nonrotatably connecting the projecting end of said piston rod to said vehicle frame, means pivotally connecting said steerage linkage to an intermediate point on said cylinder to actuate said linkage and said steering wheels by reciprocation of said cylinder relative to said frame, said piston rod having a hollow portion formed with internal noncircular guide means, an elongated guide rod received within the hollow portion of said piston rod and having a portion slidably and nonrotatably engaged within the noncircular guide means of said piston rod, said guide rod projecting beyond the inner end of said piston rod, and interlocking means between the projecting end of said guide rod and said cylinder to prevent relative rotation between said guide rod and said cylinder to restrain the latter against rotation about its axis while permitting reciprocation of said cylinder and the steering linkage connected thereto relative to said vehicle frame.

6. The structure defined by claim 5 which is further characterized in that a flange is provided at the inner end of said guide rod, said flange being anchored to said cylinder against both axial and rotary movement.

References Cited in the file of this patent
UNITED STATES PATENTS
2,676,663   Smith _____ Apr. 27, 1954